Patented Oct. 23, 1923.

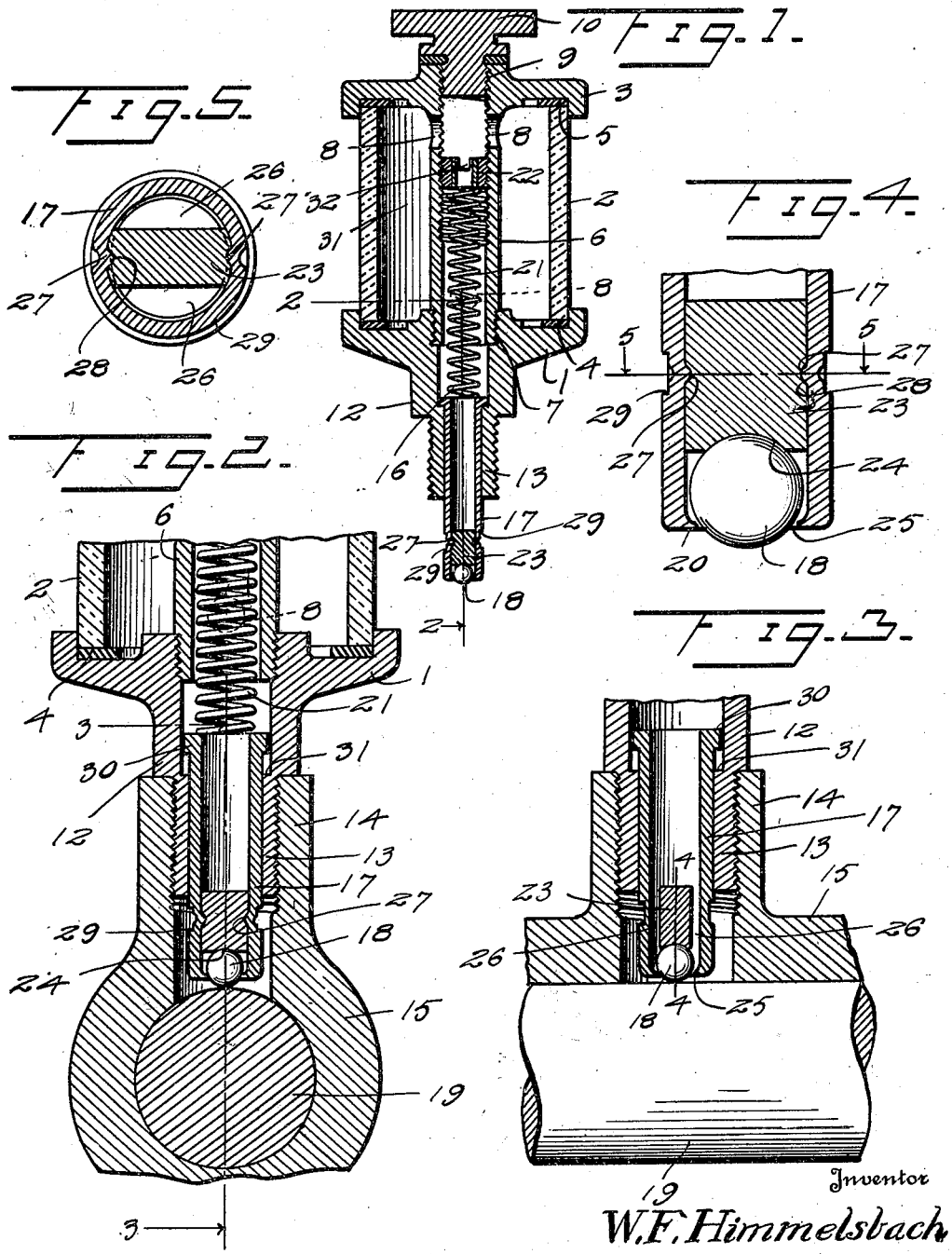

1,471,464

UNITED STATES PATENT OFFICE.

WILLIAM F. HIMMELSBACH, OF SYRACUSE, NEW YORK, ASSIGNOR TO KELLY LUBRICATOR CORPORATION, OF SYRACUSE, NEW YORK, A CORPORATION.

BALL-FEEDING VACUUM LUBRICATOR.

Application filed February 12, 1921. Serial No. 444,428.

*To all whom it may concern:*

Be it known that I, WILLIAM F. HIMMELSBACH, a citizen of the United States, residing at Syracuse, in the county of Onondaga and State of New York, have invented certain new and useful Improvements in Ball-Feeding Vacuum Lubricators, of which the following is a specification.

This invention relates to improvements in lubricators of the ball-feeding-vacuum type. In lubricators of this type the rate of feed of the lubricant depends upon the rate of rotation of the spring pressed lubricant feeding ball by the shaft or spindle being lubricated and upon the distance that the ball is supported off of its seat by the shaft or spindle. In the present embodiments of this type of lubricator the distance that the ball may be supported off of its seat by the shaft or spindle is variable and as a consequence it is necessary to adjust a part or parts of the lubricator before its application to the bearing or adjust the lubricator on the bearing with respect to the shaft or spindle in order to insure the supporting of the ball off of its seat by the shaft or spindle the distance necessary to bring about the feed of the lubricant at the rate desired. To accomplish this end is a difficult task and requires considerable time, and mistakes are frequently made which result in the engagement of the tube in which the ball is mounted with the shaft or spindle. When this occurs the lubricant will not feed at the desired rate and the lubricator will soon become unfit for use owing to the wearing away and the consequent enlargement of the diameter of the ball seat.

An object of my invention is the provision of a lubricator wherein the ball shall be supported off of its seat the desired distance by the shaft or spindle without adjusting any part or parts of the lubricator and without adjusting the lubricator on the bearing with respect to the shaft or spindle but on the mere application of the lubricator to the bearing.

Another object of the invention is the provision of a lubricator of such construction as to render it impossible for the ball carrying tube to engage the shaft or spindle.

A further object of the invention is the provision of a lubricator which shall be simple, durable and efficient, which may be readily and quickly applied to a bearing by an unskilled person, and which may be manufactured and sold at a comparatively low cost.

With the above and other objects in view, the invention consists in the construction, combination and arrangement of parts hereinafter fully described and claimed, and illustrated in the accompanying drawing, wherein:—

Figure 1 is a sectional view taken on a plane extending vertically and centrally through a lubricator constructed in accordance with my invention.

Figure 2 is a sectional view taken on the vertical plane indicated by the line 2—2 of Figure 1, this view illustrating the application of the lubricator.

Figure 3 is a sectional view taken on the vertical plane indicated by the line 3—3 of Figure 2.

Figure 4 is a sectional view taken on the vertical plane indicated by the line 4—4 of Figure 3, and Figure 5 is a sectional view taken on a horizontal plane indicated by the line 5—5 of Figure 4.

The lubricator embodies a cup consisting of a bottom 1, a glass body 2 and a top 3. A washer 4 is positioned between the bottom 1 and the lower end of the body 2, and a washer 5 is positioned between the top 3 and the upper end of the body. A hollow stem 6 which extends downwardly from the under side of the top 3 is threaded as at 7 into the bottom 1, and it is provided with openings 8 to permit lubricant to flow from the filling opening 9 into the cup and to permit the lubricant to feed from the cup to a bearing. The wall of the opening 9 is threaded for the reception of a closure plug 10, and a washer 11 is positioned between the plug and the top 3. A hollow stud 12 extends downwardly from the lower side of the bottom 1, and the lower portion 13 thereof is reduced and threaded for engagement in the cup 14 of the bearing 15, as shown in Figure 2 of the drawing. The stud 12 has a vertical bore 16 which aligns with the bore of the stem 6.

The lubricator as far as it has been described is of well known construction.

A feed tube 17 is mounted in the bore 16 for inner and outer sliding movements with respect to the cup.

The lubricant is conveyed from the cup by the tube 17 to a ball 18 which, as shown in Figures 2 and 3 of the drawing, is adapted to engage the shaft or spindle to be lubricated, which is adapted to be rotated by the shaft or spindle, and which during its rotation applies or feeds the lubricant to the shaft or spindle. The ball 18 is carried by the tube 17, and its lower portion extends through and beyond an inwardly directed annular seat 20 formed on the lower end of the tube. A spring 21, which is located between the upper end of the tube 17 and a hollow nut 22, exerts a constant outward pressure upon the tube. In other words, the spring 21 constantly urges the tube 17 in the direction of the shaft or spindle. Owing thereto, and as the ball 18 extends beyond the seat 20, the ball will be supported off of its seat by the shaft or spindle when the lubricator is in applied position, as clearly illustrated in Figures 2 and 3 of the drawing.

The rate of feed of the lubricant depends upon the distance that the ball 18 is supported off of its seat 20 by the shaft or spindle, and upon the rate at which the ball is rotated by the shaft or spindle. To limit the distance that the ball 18 may be supported off of its seat 20, and thereby insure the desired rate of feed of the lubricant at any rate of rotation of the shaft or spindle, a stop 23 is secured in the tube 17 above the ball. The stop 23 is provided in its under side with a concave seat 24 adapted to be engaged by the ball 18 when the latter is in its elevated position with respect to its seat 20. The stop 23 not only limits the distance that the ball 18 may be supported off of its seat 20, but also prevents the lower end of the tube 17 from engaging the shaft or spindle. As the seat 24 of the stop 23 is concave, and as the ball 18 engages the seat 24 when it is in elevated position with respect to its seat 20, the annular opening 25 between the elevated ball and the seat 20 is of uniform width throughout, and in view thereof each rotation of the ball will feed a fixed quantity of lubricant to the shaft or spindle.

As shown in Figures 3 and 5 of the drawing, the stop 23 is of less thickness than the internal diameter of the tube 17, and it is secured centrally within the tube to provide passages 26 on opposite sides thereof to permit the lubricant to flow to the ball. While any suitable means may be employed to secure the stop 23 in the tube 17 against any movement with respect to the tube, it is preferred to secure it in place by lugs 27 struck up from the tube 17 into grooves 28 in the ends of the stop. To permit these lugs to be readily formed, the tube 17 is provided with an annular groove 29.

The outer movement of the tube 17 with respect to the cup is limited by a flange 30 which is formed on the upper end of the tube and by a shoulder 31 which is formed by the enlargement of the upper portion of the bore 16 of the stud 12 to receive said flange. The nut 22 has threaded engagement with the inner wall of the stem 6 to permit it to be adjusted with respect to the stem when it is desired to increase or decrease the tension of the spring 21. The nut 22 is accessible through the filling opening 9 of the top 3, and to permit of its being adjusted by a screw driver or other instrument it is provided with nicks 31.

As the lubricator includes a slidably mounted and spring pressed ball carrying tube, and as the distance that the ball may be supported off of its annular seat by a shaft or spindle is limited by means carried by the tube, it should be apparent that the desired rate of feed of the lubricant is insured without adjusting any part of the lubricator and without adjusting the lubricator in the bearing cup with respect to the shaft or spindle, it only being necessary to turn the stud 12 in the bearing cup until the shoulder 31 formed by the reduction of the lower part of the stud engages the bearing cup if a straight thread is used on the stud, or turn the lubricator in the bearing cup until a tight fit is secured if a tapered thread is used on the stud. Since the desired rate of feed of the lubricant is obtained without adjusting any part of the lubricator and without adjusting the lubricator in the bearing cup, a straight or tapered thread may be used on the stud 12. As the distance that the ball may be supported off of its seat by a shaft or spindle is limited by the stop, and as the stop is carried by the tube, all liability of the lower end of the tube being engaged with the shaft or spindle during or after the application of the lubricator to a bearing is obviated.

It should be apparent from the foregoing description, taken in connection with the accompanying drawing, that to accomplish the desired ends the invention comprehends the employment of a yielding or non-yielding lubricant conveying tube, a lubricant applying ball carried by the tube for engagement with the shaft or spindle being lubricated, and means adapted to limit the distance that the ball may be pressed back into the feed tube by reason of its engagement with the shaft or spindle during or after the application of the lubricator to a bearing. Obviously, means other than the spring may be employed to constantly urge the tube outwardly with respect to the cup, and if preferred the tube may be made of such weight as to accomplish this end.

While the preferred embodiment of this invention is shown and described it will be understood that minor changes in the details of construction and arrangement of parts may be resorted to within the scope of what is claimed without departing from the spirit of the invention.

The term seat as employed in the foregoing description and following claims is to be construed as covering any formation of the outer end of the tube 17 capable of retaining the ball 18, and the term ball is to be construed as covering any form of applicator capable of being rotated by the shaft or spindle being lubricated.

Having thus described the invention, what I claim is:—

1. A lubricator including a cup, a yielding lubricant conveying tube having a seat at its outer end, a lubricant applying ball within the tube adapted to extend through the seat into engagement with the shaft or spindle being lubricated and adapted to be supported off of the seat by the shaft or spindle, and means adapted to limit the distance that the ball may be supported off of the seat by the shaft or spindle.

2. A lubricator including a cup, a lubricant conveying tube slidably mounted with respect to the cup and having a seat at its outer end, a lubricant applying ball carried by the tube and adapted to extend through the seat into engagement with the shaft or spindle being lubricated and adapted to be supported off of the seat by the shaft or spindle, and means adapted to limit the distance that the ball may be supported off of the seat by the shaft or spindle.

3. A lubricator including a cup, a lubricant conveying tube yieldingly mounted with respect to the cup and provided at its outer end with a seat, a lubricant applying ball carried by the tube and adapted to extend through the seat into engagement with the shaft or spindle being lubricated and adapted to be supported off of the seat by the shaft or spindle, and means carried by the tube adapted to limit the distance that the ball may be supported off of the seat by the shaft or spindle.

4. A lubricator including a cup, a lubricant conveying tube yieldingly mounted with respect to the cup and having a seat at its outer end, a lubricant applying ball carried by the tube and adapted to extend through the seat into engagement with the shaft or spindle being lubricated and adapted to be supported off of the seat by the shaft or spindle, and an element carried by the tube inwardly of the ball to limit the distance that the ball may be supported off of the seat by the shaft or spindle.

5. A lubricator including a cup, a lubricant conveying tube yieldingly mounted with respect to the cup and having a seat at its outer end, a lubricant applying ball carried by the tube and adapted to extend through the seat into engagement with the shaft or spindle being lubricated and adapted to be supported off of the seat by the shaft or spindle, and a stop secured within the tube above the ball to limit the distance that the ball may be supported off of its seat by the shaft or spindle, said stop having a concave seat in its under side for engagement by the ball when it is in elevated position with respect to the seat of the tube.

6. A lubricator including a cup, a lubricant conveying tube mounted upon the cup for inner and outer sliding movements with respect thereto, means for limiting the outward movement of the tube with respect to the cup, means yieldingly urging the tube outwardly with respect to the cup, a seat formed at the outer end of the tube, a lubricant applying ball carried by the tube and adapted to extend through the seat into engagement with the shaft or spindle being lubricated and adapted to be supported off of the seat by the shaft or spindle, and means carried by the tube to limit the distance that the ball may be supported off of the seat by the shaft or spindle.

7. A lubricator including a cup, a lubricant conveying tube mounted on the cup for inner and outer sliding movements with respect thereto, means adapted to limit the outward movement of the tube with respect to the cup, means yieldingly urging the tube outwardly with respect to the cup, a seat formed on the outer end of the tube, a ball carried by the tube and adapted to extend through the seat into engagement with the shaft or spindle being lubricated and adapted to be supported off of its seat by the shaft or spindle, and a stop carried by the tube inwardly of the ball to limit the distance that the ball may be supported off of its seat by the shaft or spindle and having a concave seat adapted to be engaged by the ball when the latter is supported off of the tube seat.

8. A lubricator including a cup, a self-adjusting lubricant conveying tube carried by the cup and provided at its outer end with a seat, a lubricant applying ball carried by the tube and extending through the seat, and a stop carried by the tube inwardly of the ball.

9. A lubricator including a cup, a lubricant conveying tube adjustably connected to the cup and having a seat at its outer end, a lubricant applying ball carried by the tube and extending through the seat, and means adapted to prevent the tube from engaging the shaft or spindle being lubricated and adapted to limit the distance that the ball may be supported off of the seat by the shaft or spindle.

10. A lubricator including a cup, a conveying tube extending from the cup, a rolling applicator within the tube adapted to engage the part to be lubricated, and a non-yielding stop carried by the tube for engagement by the applicator when the latter is in contact with the part to be lubricated.

11. A lubricator including a cup, a lubricant conveying tube extending from the cup, a rolling applicator within the tube adapted to extend beyond the outer end thereof for engagement with the part to be lubricated, and a non-yielding stop within the tube inwardly of the applicator for engagement by the applicator when it is in engagement with the part to be lubricated.

12. A lubricator including a cup, a lubricant conveying tube extending from the cup, a ball within the tube adapted to extend beyond the outer end thereof into engagement with the part to be lubricated, and a stop carried by the tube inwardly of the ball at a distance from the outer end of the tube less than the diameter of the ball.

13. A lubricator including a cup, a lubricant conveying tube extending from the cup, a ball within the tube adapted to extend beyond the outer end thereof into engagement with the part to be lubricated, and a stop carried by the tube inwardly of the ball to limit the movement of the ball into the tube and to maintain the ball centrally with respect to the tube when it is in contact with the part to be lubricated.

14. A lubricator including a cup, a lubricant conveying tube yieldingly carried by the cup, an applicator carried by the tube and adapted to extend beyond the outer end thereof into engagement with the part to be lubricated, and a stop carried by the tube inwardly of the applicator to limit the movement thereof into the tube.

15. A lubricator including a cup, a lubricant conveying tube slidably carried by the cup, an applicator carried by the tube and adapted to extend beyond the outer end thereof into engagement with the part to be lubricated, and a stop carried by the tube inwardly of the applicator to limit the movement thereof into the tube.

16. A lubricator comprising a cup, a feed tube carried by the cup, a lubricant applying ball carried by the feed tube for engagement with the part to be lubricated, and means adapted to prevent the feed tube from engaging said part.

17. A lubricator comprising a cup, a feed tube carried by the cup, a lubricant applying ball carried by the feed tube for engagement with the part to be lubricated, and means adapted to prevent the feed tube from engaging said part and limit the distance that the ball may be pressed back into the feed tube by said part.

18. A lubricator comprising a cup, a feed tube slidable with respect to the cup, a spring exerting pressure on the feed tube outwardly with respect to the cup, and a lubricant applying ball carried by the feed tube for contact with the part to be lubricated.

19. A lubricator comprising a cup, a feed tube slidable with respect to the cup, a spring exerting pressure on the feed tube outwardly with respect to the cup, a lubricant applying ball carried by the feed tube for contact with the part to be lubricated, and a stop within the feed tube inwardly of the ball.

20. A lubricator comprising a cup, a feed tube slidable with respect to the cup, a spring exerting pressure on the feed tube outwardly with respect to the cup, a lubricant applying ball carried by the feed tube for contact with the part to be lubricated, and means for holding the ball in engagement with said part.

21. A lubricator comprising a cup, a feed tube slidable with respect to the cup and yieldingly urged outwardly with respect thereto, a lubricant applying ball carried by the feed tube for engagement with the part to be lubricated, and means for holding the ball in engagement with said part.

22. A lubricator comprising a cup, a feed tube slidable with respect to the cup and yieldingly urged outwardly with respect thereto, a lubricant applying ball carried by the feed tube for engagement with the part to be lubricated, and means carried by the feed tube for holding the ball in engagement with said part.

23. A lubricator comprising a cup, a feed tube yieldable with respect to the cup, a lubricant applying ball carried by the feed tube for engagement with the part to be lubricated, and means for holding the ball in engagement with said part.

24. A lubricator comprising a cup, a feed tube yieldable with respect to the cup, a lubricant applying ball carried by the feed tube for engagement with the part to be lubricated, and means carried by the feed tube for holding the ball in engagement with the part to be lubricated.

25. A lubricator comprising a cup, a feed tube in constant communication with the cup, means urging the feed tube in the direction of the part to be lubricated, an applicator carried by the feed tube for rolling contact with said part, and means adapted to hold the feed tube out of contact with said part and to hold the applicator in contact with said part.

26. A lubricator comprising a cup, a feed tube in constant communication with the cup, means urging the feed tube in the direction of the part to be lubricated, an applicator carried by the feed tube for rolling contact with said part, and means cooperating with said first named means and with the feed tube and applicator to hold the feed tube out of contact with said part and to hold the applicator in contact with said part.

27. A lubricator having a yielding feed tube, a rolling applicator associated with the discharge end of the feed tube for contact with the part to be lubricated, and means adapted to hold the applicator in contact with such part.

28. A lubricator having a yielding feed tube, a rolling applicator associated with the discharge end of the feed tube for contact with the part to be lubricated, and means adapted to hold the applicator in contact with such part and centrally with respect to the feed tube.

29. A lubricator having a yielding feed tube, a rolling applicator associated with the discharge end of the feed tube for contact with the part to be lubricated, and means adapted to hold the applicator in contact with such part and the feed tube out of contact with such part.

30. A lubricator having a yielding feed tube, a rolling applicator associated with the discharge end of the feed tube for contact with the part to be lubricated, and means adapted to hold the applicator in contact with such part and centrally with respect to the feed tube, and also adapted to hold the feed tube out of contact with such part.

31. A lubricator comprising a cup, a yielding feed tube, means limiting the movement of the feed tube with respect to the cup, and a rolling applicator carried by the feed tube.

32. A lubricator comprising a cup, a yielding feed tube, means limiting the movement of the feed tube with respect to the cup, a rolling applicator carried by the feed tube, and means adapted to hold the applicator in contact with the part to be lubricated.

33. A lubricator comprising a cup, a yielding feed tube, means limiting the movement of the feed tube with respect to the cup, a rolling applicator carried by the feed tube, and means adapted to hold the applicator in contact with the part to be lubricated, and hold the feed tube out of contact with such part.

In testimony whereof I affix my signature.

WILLIAM F. HIMMELSBACH.